Patented Apr. 28, 1953

2,636,808

UNITED STATES PATENT OFFICE 2,636,808

STABILIZED SODIUM ACID PYROPHOSPHATE OF IMPROVED DOUGHNUT BAKING PROPERTIES AND METHOD OF PRODUCING SAME

Findley E. Hubbard and Felix H. Wright, Jr., Anniston, Ala., assignors to Monsanto Chemical Company, St. Louis, Mo., a corporation of Delaware No Drawing. Application May 15, 1950, Serial No. 162,142

8 Claims. (Cl. 23—106)

The present invention relates to a fast reacting sodium acid pyrophosphate and to a novel method of producing same.

The principal object of the invention is to provide sodium acid pyrophosphate having a combination of properties which render it eminently suitable for use in the production of doughnuts.

Another object is to provide sodium acid pyrophosphate having a reaction rate of 32 to 40 and preferably from 34 to 38 inclusive.

A further object is to provide sodium acid pyrophosphate having a reaction rate within the above range, which does not increase more than 5%, and preferably not more than 3%, when the above product is subjected to 66% R. H. (relative humidity) and a temperature of 90° F. for a period of 8 days.

A still further object is to provide a novel method of producing sodium acid pyrophosphate having the above desirable properties.

Other objects and advantages will become apparent to those skilled in the art as the description proceeds.

The preparation of uniform doughnuts of good color and texture with low grease soaking properties, regular flutes and plump well rounded walls requires sodium acid pyrophosphate with a special combination of properties.

For example, if the above leavening acid has a reaction rate which is too slow, i. e., below 32, doughnuts prepared from doughnut mixes containing same are deformed and have a cracked surface which impairs their appearance. Moreover, the cracked surfaces of the doughnuts permit excessive grease absorption which has a deleterious effect on their palatability. On the other hand, if the reaction rate of the sodium acid pyrophosphate is to fast, i. e., above 40, the doughnuts are deformed, bloated and the surface perforated by gas blow holes with the result that they absorb excessive quantities of grease which substantially impairs their appearance and palatability.

While a fast reaction rate is an essential property of a satisfactory leavening acid for baking doughnuts, it is not the only factor which determines the utility of sodium acid pyrophosphate for the above purpose. For example, a sodium acid pyrophosphate may have a reaction rate within the range of 32 to 40 and still not yield satisfactory doughnuts; in order to perform this function satisfactorily and at the same time possess the desired stability to change in reaction rate, it must contain the aluminum and alkali metal oxide impurities disclosed in Patent 2,408,258 to Eugene N. Hetzel et al., and be treated in the manner hereinafter described.

In accordance with the present invention, a method of treating "stabilized sodium acid pyrophosphate" has been developed whereby a relatively stable, fast reacting product is obtained which is eminently suitable for use in the baking of doughnuts.

"Stabilized sodium acid pyrophosphate" is the product disclosed and claimed in the above-mentioned patent to Eugene N. Hetzel et al. and for the sake of convenience, it will be hereinafter designated in the specification and claims by the above expression.

Briefly described, the above method consists in mixing stabilized sodium acid pyrophosphate with about 0.5% to about 5% by weight of liquid water and heating the resulting product to a temperature substantially in the range of 90° C. to 103° C., and preferably in the range of 98° C. to 102° C., for a period of time sufficient to increase the reaction rate of the above product to a value of from 32 to 40 and preferably to a value of from 34 to 38. At the end of this operation the product is dried, cooled and milled to the required particle size.

The invention will be further illustrated by the following specific examples. However, it should be understood that although these examples may describe in detail certain specific features of the invention, they are given primarily for purposes of illustration and the invention in its broader aspects is not limited thereto.

EXAMPLE I 4000 lbs. of "stabilized sodium acid pyrophosphate" flakes with a dough reaction rate of about 27 were introduced into a suitable mixer and heated to a temperature of about 100° C. At this point, 20 lbs. of water was added in a period of about 0.5 minute, whereupon the mixer was closed and the temperature brought up to and maintained at 98° C. to 102° C. The sodium acid pyrophosphate was subjected to the above water treatment while heating and mixing for a period of 30 minutes. During this time, the pressure inside the mixer varied from zero to about 6 to 8 inches of water.

After the above described treatment, the mixer was opened and the charge dried while mixing for one hour at about 100° C. After drying, the product was dumped, cooled to about 40° C. and milled to the desired particle size range.

The dough reaction rate for the above product was 33.6 and the ignition loss was 8.3%.

EXAMPLE II 4000 lbs. of flaked, stabilized sodium acid pyrophosphate with a dough reaction rate of about 27 was introduced into a mixer and heated to a temperature of 100° C. in about 32 minutes. 30 lbs. of water was added in about .75 minute and the mixer was closed. The batch was mixed for 30 minutes, from the start of the water addition, at a temperature of 98° C. to 102° C. and a pressure not exceeding 12 inches of water.

After the above mixing period, the mixer was opened and the batch dried, while mixing, for 1 hour at about 100° C. After drying, the batch was dumped into a water-cooled mixer and cooled to 40° C. in about 3 hours.

The dough reaction rate for the above product was 34.5 and the ignition loss 8.1%.

EXAMPLE III

The process described in Example I was repeated using a water addition time of 0.75 minute, 40 lbs. of water and a water treatment time of 15 minutes. The product was milled to the following screen size.

*Screen size (U. S. standard sieves)*

| | Per cent |
|---|---|
| CR (cumulative retained) 80 | 0.2 |
| CR (cumulative retained) 115 | 0.6 |
| CR (cumulative retained) 325 | 9.3 |
| S (sifts) | 89.6 |
| Loss | 0.3 |

The dough reaction rate for the above product was 34.5 as compared to 27 prior to the water treatment and the ignition loss for samples dried for 15 minutes and 1 hour was 8.1%.

EXAMPE IV 20 lbs. of stabilized sodium acid pyrophosphate flakes (dough reaction rate: 28.5) were introduced into a jacketed mixer and heated to a temperature of 100° C. by passing steam under 80 lbs. pressure through the mixer jacket. Thereupon, 272 milliliters of water was added, with mixing, to the above materials, thus lowering its temperature to about 80° C. to 90° C. After closing the mixer, the mixing and heating were continued for a total of about twenty minutes, counting from the beginning of the water addition. During this time, the temperature in the mixer reached 100° C. again, whereupon the steam pressure in the jacket was reduced to 10 lbs.

At the end of the above period, the mixer lid was removed and the mixing and heating continued for another hour to dry the product. Upon removal of the lid from the mixer, the temperature dropped to about 95° C. and so the steam pressure in the jacket was increased in order to maintain the temperature in the mixer within the range of 99° C. to 101° C. After drying, the product was dumped, cooled to room temperature and then milled to a finely divided form.

EXAMPLE V 250 lbs. of stabilized sodium acid pyrophosphate having a reaction rate of 25.6 was charged into a jacketed mixer and heated to 100° C. in about 15 minutes. 10 lbs. of water was then added and the charge heated to about 100° C. while mixing for about 30 minutes with the mixer lid closed. Thereafter, the mixing and heating were continued for 1 hour with the lid removed to dry the product. After drying, the product was cooled to about 40° C. and then milled.

The dough reaction rate of the product obtained in the foregoing manner was 35.6.

EXAMPLE VI 500 grams of stabilized sodium acid pyrophosphate flakes (dough reaction rate: about 27) were placed in a preheated mixer and heated to 102° C. 25 milliliters of water was then added and after closing the mixer, the wet flakes were heated while kneading for a total of 10 minutes. The temperature fell to 96° C. on the addition of the water and rose to 98° C. at the end of the above period.

At the end of the kneading operation, the lid was removed from the mixer and the product dried for 60 minutes at 100° C. After drying, the product was milled and put through a 200 mesh screen.

The products of Examples I to VI inclusive were found to be vastly improved doughnut leavening agents over untreated stabilized sodium acid pyrophosphate. For example, when a typical untreated sample of stabilized sodium acid pyrophosphate and the above products were used with a commercially prepared doughnut mix in the baking of doughnuts, the following results were obtained:

| Sodium Acid Pyrophosphate | Dough Reaction Rate | Baking Score |
|---|---|---|
| Untreated Sample | 27.5 | 44.7 |
| Example I | 33.6 | 64.0 |
| Example II | 34.7 | 68 |
| Example III | 34.5 | 78.0 |
| Example IV | 32.5 | 75.7 |
| Example V | 35.6 | 74.5 |
| Example VI | 33.9 | 70.0 |

A doughnut having a total score of at least 60 is deemed satisfactory while the converse of this is true of doughnuts having a baking score below the above value. Therefore, it is evident from the above data that the water treatment described herein converts "stabilized sodium acid pyrophosphate" into a product which is eminently suitable for use in baking doughnuts.

In arriving at the above baking scores, the appearance of the up side and down side of the doughnuts is taken into consideration. The former is considered the more important of the two and is given a total rating of 65, whereas the latter is assigned a total rating of 35. The above total ratings are broken down as follows:

*Up side of doughnut*

| | |
|---|---|
| Dishing | 30 |
| Breaks | 10 |
| Color | 5 |
| Surface texture | 20 |
| Total | 65 |

*Down side of doughnut*

| | |
|---|---|
| Flutes | 30 |
| Blisters | 5 |
| Total | 35 |

The above method, although qualitative in nature, constitutes a very convenient and practical means of evaluating the effectiveness of a given leavening acid in the baking of doughnuts and the results obtained by those skilled in the art of applying this test agree quite closely.

As pointed out earlier herein, the stabilized sodium acid pyrophosphate disclosed and claimed in Patent 2,408,258 to Eugene N. Hetzel et al. is employed as the starting material in the practice of the instant invention and its initial reaction rate varies within the range of about 25 to 30 depending upon its content of alkali metal oxide and $Al_2O_3$ impurities. Therefore, the hereinafter described operating conditions will vary to some extent with the initial reaction rate of the stabilized sodium acid pyrophosphate to be treated.

In carrying the instant invention into execution, stabilized sodium acid pyrophosphate is mixed with about 0.5% to about 5% by weight of water and then heated for a period of time sufficient to raise the reaction rate of the above product to a value within the range of 32 to 40 and preferably within the range of 34 to 38. More specifically, this objective is desirably accomplished by heating the above mixture to a temperature of about 90° C. to about 103° C. and preferably to a temperature of from 98° C. to 102° C. for a period of about 10 to about 30 minutes. Within the foregoing limits, it is preferred to use a water content of about 1% by weight, a temperature of about 100° C. and a water treatment time of about 15 minutes as a product having the most satisfactory doughnut baking properties is thereby obtained.

The water treated sodium acid pyrophosphate obtained in the manner hereinbefore described is dried, cooled and ground to the required particle size.

The drying operation is desirably carried out until the sodium acid pyrophosphate has an ignition loss of about 8.0–8.3% by weight when heated at 850° C. for 30 minutes. In practice, this is preferably accomplished by heating the water-treated material for about one hour at 100° C. while kneading or mixing same, but any other equivalent means may be employed.

The method of cooling is not critical and may be effected in any desired manner not involving further direct contact with water. In practice, this is achieved by dumping the dried material into a jacketed Robinson mixer and cooling in about 3 hours to 40° C.

After cooling, the product is ground to the required particle size. This step is important since the reaction rate of the product is affected by its particle size. It is, therefore, essential that the dried product be milled to a fineness permitting at least 75% by weight of the material to pass through a 325 mesh screen. More particularly, it is desirable that the product be ground to meet the following specifications:

*Screen size (U. S. standard sieves)*

| | |
|---|---|
| CR 80 | 0–0.1 |
| CR 100 | 0–0.5 |
| CR 325 | 10–25.0 |

The products of the instant invention are admirably suitable for use in the baking of doughnuts, giving a baking score of 60 to about 80. Moreover, they are characterized by excellent stability to change in reaction rate. For example, they do not vary in this respect more than 5% and usually not more than 3% when subjected to 66% R. H. and a temperature of 90° F. for a period of 8 days. This is important since in practice the above products are not used immediately after they are prepared.

The dough reaction rate as used in the present specification is the amount of carbon dioxide evolved from moist dough leavened with sodium acid pyrophosphate during the first 8 minutes at a temperature of 27° C. For example, if the above compound in a leavening composition containing sodium bicarbonate liberates at 27° C. about 35% of the contained carbon dioxide over a period of eight minutes, it exhibits a reaction rate of 35. For a more detailed discussion of dough reaction rate, reference is made to "Cereal Chemistry," vol. 8, page 423 of 1931.

The ignition loss as used in the present specification is the percentage by weight of volatile material liberated by heating the dried sodium acid pyrophosphate products at a temperature of 850° C. for 30 minutes.

"Reaction rate" as employed herein signifies the percentage of the contained carbon dioxide liberated at 26° C. over a period of 8 minutes from moist dough containing sodium acid pyrophosphate and sodium bicarbonate.

While the invention has been described in a detailed manner with illustrated suitable modes of executing same, it is to be understood that modifications may be made and that no limitations other than those imposed by the scope of the appended claims are intended.

We claim:

1. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises heating in a closed container a mixture of said sodium acid pyrophosphate and from 0.5% to about 5% by weight of water for a sufficient period of time to increase the reaction rate of said sodium acid pyrophosphate to a value within the range of 32 to 40.

2. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises heating in a closed container a mixture of said sodium acid pyrophosphate and from 0.5% to about 5% by weight of water to a temperature of about 90° C. to about 103° C. for a period of about 10 to about 30 minutes, drying and then grinding the resulting material to a finely divided state.

3. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises heating in a closed container a mixture of said sodium acid pyrophosphate and from 0.5% to about 0.75% by weight of water to a temperature of about 100° C. for period of 20 to 30 minutes, drying and then grinding the resulting product to a finely divided state.

4. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises heating in a closed container a mixture of said sodium acid pyrophosphate and about 1% by weight of water to a temperature of about 100° C. for a period of about 10 to 20 minutes, drying and then grinding the resulting product to a finely divided state.

5. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises introducing said sodium acid pyrophosphate in the form of flakes into a mixer heated to a temperature of about 100° C., adding about 0.5% by weight of water thereto, heating with said mixer closed said moistened flakes to a temperature of 98° C. to 102° C. while mixing same for a period of about 30 minutes, drying the resulting product by heating for about 1 hour at 100° C., cooling and then milling the dried product to a finely divided state.

6. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises introducing said sodium acid pyrophosphate in the form of flakes into a mixer heated to a temperature of about 100° C., adding about 0.75% by weight of water thereto, heating with said mixer closed said moistened flakes to a temperature of about 98° C. to about 102° C. while mixing same for a period of about 30 minutes, drying the resulting product by heating for about 1 hour at about 100° C., cooling and then milling the dried product to a finely divided state.

7. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$, which comprises introducing said sodium acid pyrophosphate in the form of flakes into a mixer heated to a temperature of about 100° C., adding about 1% by weight of water thereto, heating with said mixer closed said moistened flakes to a temperature of about 98° C. to about 102° C. while mixing same for a period of about 15 minutes, drying the resulting product by heating for about 1 hour at about 100° C., cooling and then milling the dried product to substantially the following particle size:

*Screen size (U. S. standard sieves)*

| | Per cent |
|---|---|
| CR (cumulative retained) 80 | 0.2 |
| CR (cumulative retained) 115 | 0.6 |
| CR (cumulative retained) 325 | 9.3 |
| S (sifts) | 89.6 |
| Loss | 0.3 |

8. Sodium acid pyrophosphate of substantially improved doughnut baking properties produced by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed, thereafter tempering said pyrophosphate by maintaining it at a temperature of about 225° C. to about 235° C. for a period of about 4 to about 6 hours, and then heating in a closed container a mixture of said tempered sodium acid pyrophosphate and from 0.5% to about 5% by weight of water for a sufficient period of time to increase the reaction rate of said tempered sodium acid pyrophosphate to a value within the range of 32 to 40, said sodium orthophosphate solution containing about 0.10% to about 0.20% $K_2O$ and about 0.025% to about 0.075% $Al_2O_3$, basis $NaH_2PO_4$.

FINDLEY E. HUBBARD.
FELIX H. WRIGHT, Jr.

References Cited in the file of this patent

UNITED STATES PATENTS

| Number | Name | Date |
|---|---|---|
| 2,408,258 | Hetzel et al. | Sept. 24, 1946 |